3,274,402
SENSING AND MULTIPLEXING SYSTEMS
Clark F. Crocker, South Sudbury, Mass., assignor to Raytheon Company, Lexington, Mass., a corporation of Delaware
Filed Apr. 29, 1963, Ser. No. 276,561
4 Claims. (Cl. 307—119)

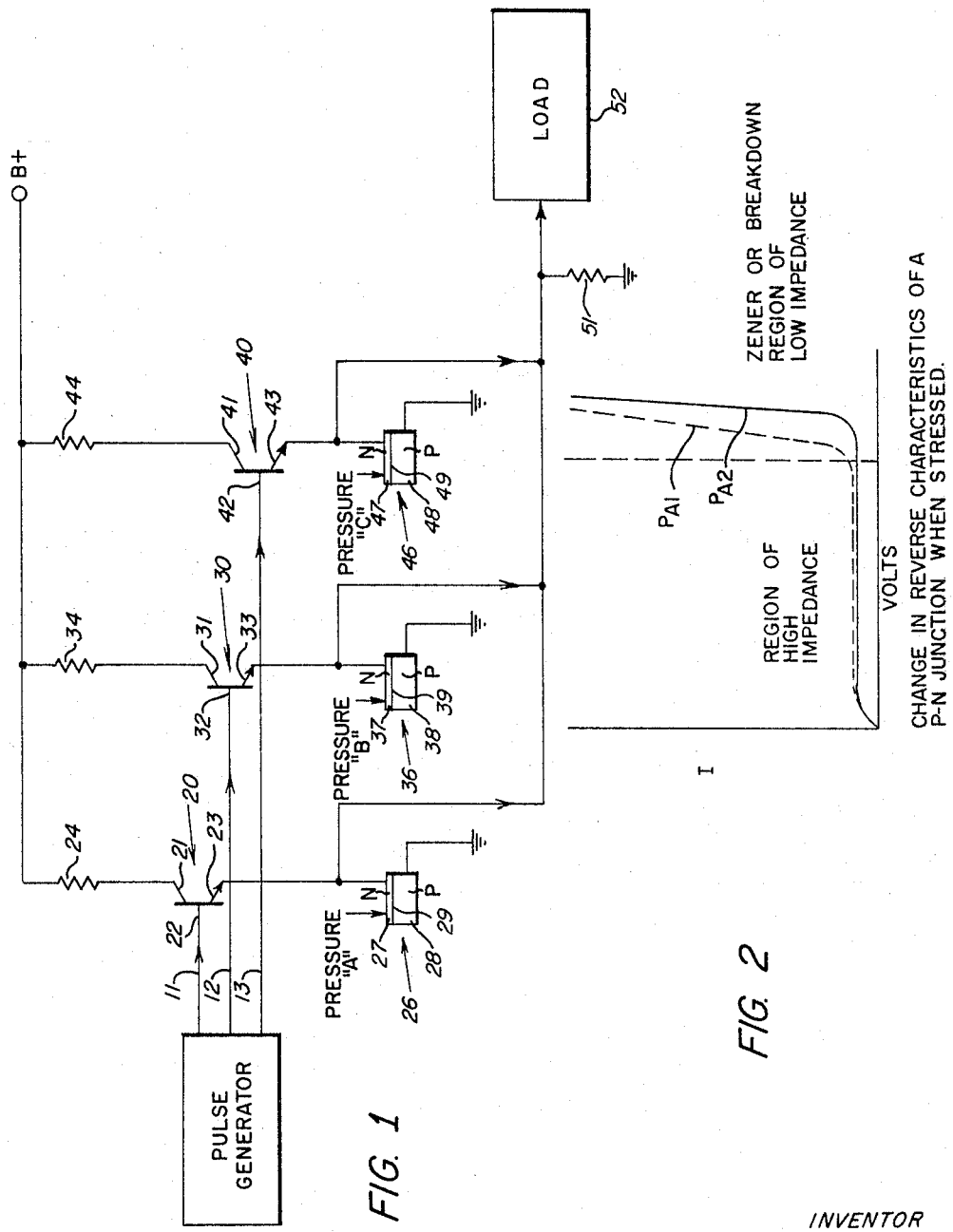

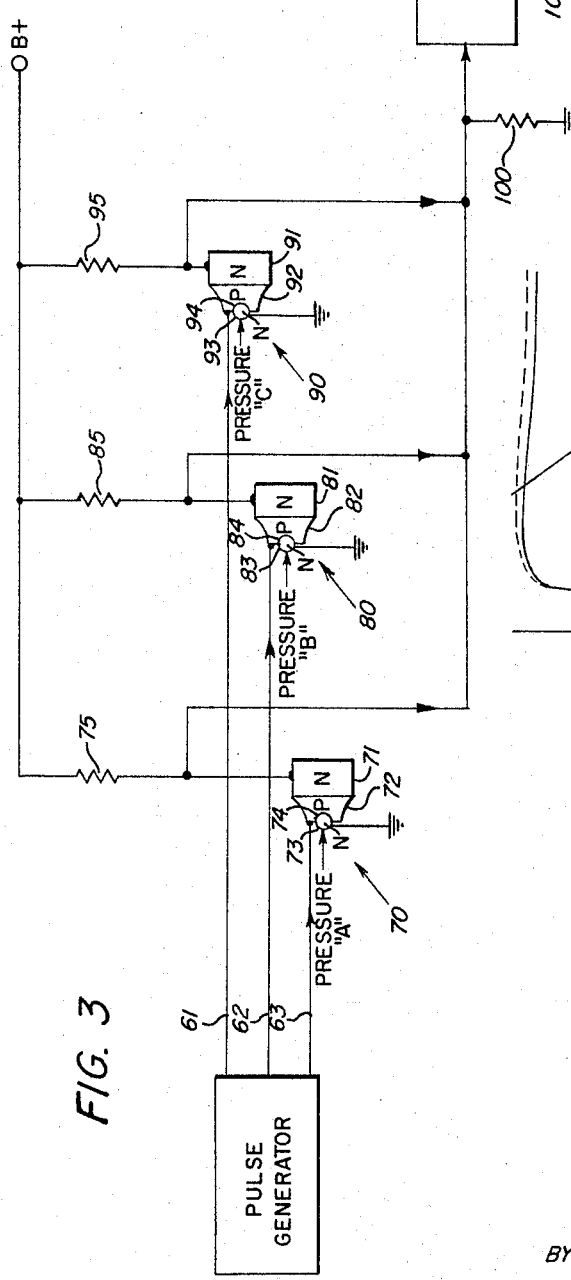
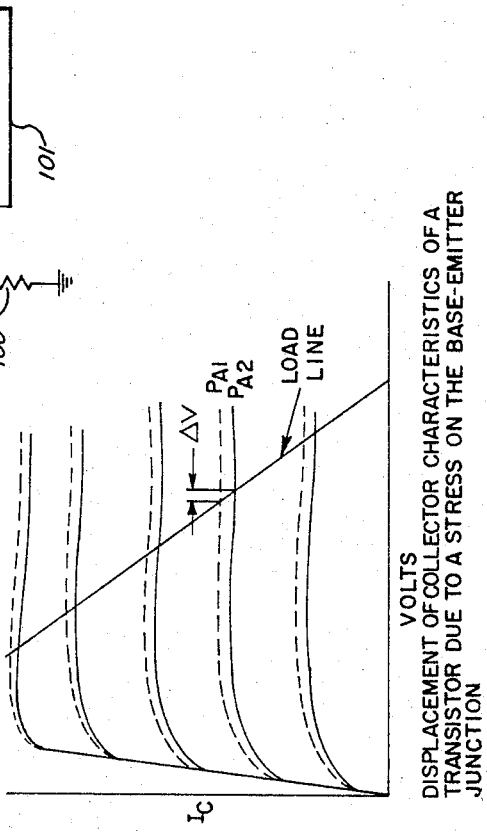
FIG. 3
FIG. 4
INVENTOR
CLARK F. CROCKER
BY Herbert W. Arnold
ATTORNEY

United States Patent Office 3,274,402
Patented Sept. 20, 1966

This invention relates to sensor systems and more particularly to devices for switching or multiplexing sensor signals.

The present invention sets forth an improved device particularly suitable for not only detecting mechanical stresses, but switching or multiplexing electrical quantities from a plurality of parallel connected sensors directly into a single common output.

Prior art devices generally utilize linear type resistive strain gauge devices which require individual amplifiers for the sensed outputs due to the low electrical output levels available from said devices. Additionally, in order to multiplex or switch these devices complex switching means are necessary to sample these low level signals to provide them to a common amplifier.

Accordingly, it is an object of this invention to provide a technique for multiplexing or switching sensor signals without the inherent complexity of prior art devices.

It is an additional object of this invention to provide a device which not only provides the sensing function, but which can also simultaneously perform a switching or multiplexing function.

The sensing and multiplexing system embodying this invention comprises a plurality of devices which are utilized as transducers or sensors as well as switches for multiplexing a plurality of signals to a common output. In a first embodiment, one of a plurality of diode sensors is placed in a reverse current direction in order to sample a force or pressure being detected by the sensor.

In another embodiment, one of a plurality of transistor sensors is placed in a conductive condition in order to detect and multiplex the result of a pressure causing a stress across its base to emitter junction.

Other objectives and features of this invention will become apparent from the following description taken in connection with the following drawings, wherein:

FIG. 1 is a schematic diagram of a sensor and multiplexing device utilizing diode sensors according to the invention;

FIG. 2 is a graph of the reverse current characteristics under pressure applied to a diode sensor according to the invention;

FIG. 3 is a schematic diagram of a sensing and multiplexing device utilizing transistor sensors according to the invention; and FIG. 4 is a graph of the current voltage characteristics of a transistor sensor under varying pressures according to the invention.

Referring now to FIG. 1 which shows a schematic diagram of a sensor and multiplexing device according to the invention, a pulse generator 10 is shown for providing sequential or predetermined time related output signals on lines 11, 12 and 13. These output signals are utilized for sequentially turning on transistors 20, 30 and 40, which will be disclosed at a later time.

The pulse generator 10 could be of a counting type pulse generator, as disclosed in the book "Pulse and Digital Circuits" by Jacob Millman and Herbert Taub, published by the McGraw Hill Book Company, Inc. in 1956 and found in Chapter 11 and more particularly Sec. 11-9, wherein there is shown a ring counter which could be utilized for the purpose of obtaining time displaced pulses to sequentially turn "on" or render "conducting" transistors 20, 30 and 40. Additionally, this pulse generator 10 could be of the type disclosed in a co-pending U.S. patent application in the name of Trevor Temple, Serial No. 248,777, filed on December 31, 1962 and assigned to the assignee of this invention. Particularly, in co-pending application 248,777, there is disclosed in FIGS. 9a and 9b a first counter which could be utilized for the purpose of generating time spaced output pulses to sequentially turn on transistors 20, 30 and 40 of FIG. 1.

A first NPN transistor 20 is shown having a collector 21, a base 22 and an emitter 23. The collector 21 is shown coupled through a collector load resistor 24 to a source of B+. The base 22 is shown connected to the output line 11 of the output generator 10 and the emitter 23 is shown coupled to a sensor 26. The transistor 20 is utilized to place the sensor 26 in condition to permit an electrical signal representative of the pressure which it is sensing to be applied to a common load 52 of FIG. 1. The load 52 can be an amplifier, a common analog to digital converter, a common transistor, or other type of output device.

The sensor 26 comprises a diode having a thin first N layer 27 mounted on a P layer 28 and having a pressure or stress sensitive shallow junction 29 between said P and N layers. A pressure "A" is shown being applied to a small portion or point on the top surface of diode layer 27 to produce a concentrated, non-uniform, anisotropic stress or pressure confined to a small volume of the shallow junction between the layers 27 and 28 and thereby produce an output signal proportional to the pressure "A" being applied. In particular, the preferred embodiment utilizes the diode sensor described in co-pending U.S. applications, Serial No. 183,940, filed on March 30, 1962 and Serial No. 261,065, filed on February 26, 1963 by Wilhelm Rindner and assigned to the assignee of this invention. The diode sensor disclosed in this co-pending application is particularly useful due to its high electrical sensitivity.

This diode device can achieve current changes in magnitude of as much as four orders when stresses corresponding to forces of only approximately 5 gram weights are being applied and thus achieves changes in junction parameters by factors of the order of 10,000. Such achievement is accomplished by locating the junction only slightly below the surface and selecting a small portion thereof to concentrate non-uniform anisotropic stresses, whereby such a radical change in the junction parameters is obtained. Such sensor devices are readily adapted for strain transducers and pressure gauges.

To produce a concentrated, non-uniform, anisotropic stress of pressure such as shown by the arrow labeled pressure "A" in FIG. 1 at the junction of layers 27 and 28, an arm or bar pivotly supported on a bracket, not shown, could be mounted on a base. An electromagnet powered by a signal generator could also be mounted on the base in a position directly over an end portion of the arm to apply a pressure. Additionally, the arm may be mechanically coupled to sense a force or pressure. Carried by an underside of the arm, near the opposite end of the arm, a sharp stylus can be mounted to press on the surface of layer 27 closest to the junction 29. The stylus can be, for example, a standard sapphire phonograph needle having a sharp pointed area touching the surface 27. Upon energization of the electromagnet, a lever action can take place to increase the pressure of the stylus on the top surface 27 to produce a change in stress across the junction 29. This particular arrangement for producing this concentrated, non-uniform, anisotropic stress is shown in FIG. 1 of the co-pending application to Wilhelm Rindner. Furthermore, it has been found that a point having small radius of curvature, such as no greater than 250 microns, provides the best observed effects when the point is used to press against the surface of the sensor 26 closest to the junction 29. Additionally, it has been found that the application of this pressure or force perpendicular to the junction provides the best observed effects.

In addition, the diode sensor 26, for example, comprises a device having a body of semiconductor material with a barrier at the junction between the N and P type layers therein for rectifying a current flowing through said semiconductor material, said barrier being disposed at a relatively small depth below the surface of the body, as shown in the aforementioned Rindner applications. In particular, the junction depth between the N and P layers of this preferred sensor device lies at depths less than .010 inches. The layer 27 is shown coupled to the emitter 23 of transistor 20 and is also shown coupled to a dropping resistor 51 to a load or amplifier 52.

A second NPN transistor 30 is shown having a collector 31, a base 32 and an emitter 33. Collector 31 is shown connected through collector load resistor 34 to a source of B+. The base 32 is shown coupled to the output line 12 of the pulse generator 10 and the emitter 33 as shown coupled to a sensor 36. The sensor 36 comprises an N layer 37 and a P layer 38 which are joined at a pressure sensitive junction 39 upon the application of a pressure "B" which produces a force or mechanical stress at the junction 39. The layer 37 is also shown connected to the dropping resistor 51 and to the load or amplifier 52 and the layer 38 is shown coupled to ground. This device is the same type as described with relation to device 26, previously mentioned.

A third switching transistor 40 of the NPN type is shown having a collector 41, a base 42 and an emitter 43. The collector 41 is shown coupled through a collector load resistor 44 to a source of B+. The base 42 is shown connected to the output line 13 of pulse generator 10 and the emitter 43 is shown coupled to the diode sensor 46. The diode sensor 46 is shown having an N layer 47 and a P layer 48 joined together at a junction 49. A pressure "C" is applied to the layer 47 to produce a mechanical stress at the junction 49 between the layers 47 and 48. The layer 47 is shown coupled to the dropping resistor 51 and to the common load or amplifier 52. The layer 48 is shown coupled to ground.

Considering now the operation of the system of FIG. 1, in the absence of pulses provided by pulse generator 10 on lines 11, 12 and 13, transistors 20, 30 and 40 will be in the nonconducting or "off" condition and diodes 26, 36 and 46 will be in the high impedance condition. Assume now that pulse generator 10 provides a positive signal on line 11 and turns "on" or causes transistor 20 to conduct. This will then produce a current through transistor 20 which is of a sufficient magnitude to place diode sensor 26 in the Zener or breakdown condition as shown in the graph of current-voltage characteristic of FIG. 2. In this breakdown condition Zener diode 26 is in low impedance condition. From the graph of FIG. 2 it can be seen that by applying various pressures such as $P_{A1}$ or $P_{A2}$ with $P_{A1} > P_{A2}$, it is possible to significantly vary the voltage drop across the diode sensor when it is switched into the Zener region. It is also noticed from FIG. 2 that when the diode 26 is not in the Zener condition, pressures $P_{A1}$ and $P_{A2}$ will produce small voltage changes in comparison with that produced when the diode 26 is in the low impedance or Zener condition. In this manner, it is then possible sequentially to sense the pressure applied to each of the diode sensors 26, 36 and 46, inasmuch as the electrical signal output representative of the pressure being applied to the particular diode which has been switched into the high current or low impedance condition, will be shunted from the other parallel diode sensors which remain in the high impedance region.

With reference now to FIG. 3, there is shown a schematic diagram of a sensing and multiplexing device utilizing transistor transducers or sensors according to the invention. A pulse generator 60 is shown for sequentially providing output actuating pulses on lines 61, 62 and 63. The pulse generator is of the same type as described with reference to pulse generator 10 of FIG. 1. A first pressure or force sensor transistor 70 is shown having a collector N layer 71, a base P layer 72 and an emitter portion 73. A shallow junction 74 is shown between the base layer 72 and the emitter portion 73 which is sensitive to a pressure "A," which is applied in the same manner as described with reference to FIG. 2, through the emitter 73 to the junction 74. The collector layer 71 is shown connected through a load resistor 75 to a source of B+. The base layer 72 is shown coupled to output line 63 of pulse generator 60 and the emitter portion 73 is shown coupled to ground. The sensor transistor 70 of this embodiment is preferably of the type illustrated in co-pending U.S. application, Serial No. 183,940, filed March 30, 1962 to Wilhelm Rindner and assigned to the assignee of this invention. This particular transistor is characterized by the fact that a change in output voltage will be produced by the application of a point stress on a small portion of the emitter surface to produce a concentrated, non-uniform, anisotropic stress confined to a small volume of the shallow junction 74. In particular, the junction depth of the preferred sensor transistor device should lie a depth no greater than .010 inch from the top surface of the emitter portion. The collector layer 71 is also shown connected to a dropping load resistor 100 and to a load 101.

A second sensor transistor 80 is shown having a collector N type layer 81, a base P type layer 82 and an emitter N type portion 83. A junction 84 is formed between the collector layer 82 and the emitter portion 83 and is sensitive to the application of a pressure "B" applied to the emitter portion 83. The collector of layer 81 is coupled through a collector load resistor 85 to a source of B+ and is also coupled to the dropping resistor 100 and the load 101. The base layer 82 is coupled to output line 62 of pulse generator 60 and the emitter portion 83 is connected to ground.

A third sensor transistor 90 is shown having a collector N type layer 91, base P type layer 92 and an emitter N type portion 93. Junction 94 is shown between the base layer 92 and the emitter portion 93 which is sensitive to a pressure "C" which is shown being applied to the emitter portion 93. The collector layer 91 is shown coupled through a load resistor 95 to a source of B+ and is also shown coupled to the dropping resistor 100 and the load 101. The base layer 92 is shown coupled to output line 61 of pulse generator 60 and the emitter portion 93 is shown connected to ground.

Considering now the operation of the system shown in FIG. 3, in the absence of actuating pulses being applied to forward bias transistors 70, 80 and 90, each of these transistors will be in the "off" or nonconducting state and therefore in a high impedance condition. By applying a pulse from pulse generator 60 along output line 63, transistor 70 can be turned "on" or conducting and thus be placed in a low impedance condition. Thus, pressures, or variations of pressures such as shown in FIG. 4, will produce a change ΔV as shown in FIG. 4. ΔV denotes a difference in the amount of pressure $P_{A1}$ and $P_{A2}$ being applied across the emitter to base junction 74. Thus, by sequentially turning on each of these sensor transistors 70, 80 and 90, pressures being applied to each of these sensor transistors can be detected and multiplexed to a single common load. Additionally, it is to be noted that this type of device can also produce preamplification or gain which is proportional to stress which is applied to the junction 74 of sensor transistor 70.

Other embodiments of this invention utilizing the techniques described with relation to the circuit shown. FIG. 1 could be constructed utilizing relays or other type active devices, such as tubes for switching each of the sensor diodes. Additionally, other types of pulse generators or sources could be utilized to program variations in the manner in which the output of each of these sensors in FIGS. 1 and 3 are sensed. Additionally, the diodes of FIG. 1 could be utilized in the forward current direction rather than as shown in FIGS. 1 and 2. If the diodes were utilized in the forward direction, one could also multiplex and sense as described with relation to FIGS. 1 and 2 and produce similar results. Additionally, the transistor sensors of FIG. 3 could be utilized in the reverse breakdown or avalanche condition to provide a collector characteristic change to a common output device. Accordingly, it is desired that this invention not be limited except as defined by the appended claims.

What is claimed is:

1. A system comprising a plurality of parallel connected diode sensors coupled to a common load, said diode sensors having a body including first and second semiconductor layers of opposite conductivities having a junction therebetween sensitive to a force being applied to a small portion of said sensor, generator means for producing a sequence of signals, a plurality of transistor switching means each connected to said generator means and to one of said diode sensors for normally biasing said sensors in a high impedance condition, and for sequentially electrically biasing said diode sensors in a low impedance condition in response to said signals to sequentially read out a force being applied to said diode sensors.

2. A system comprising a plurality of parallel connected diode force sensors coupled to a common load, said force sensors including a barrier region responsive to a force being applied to said sensor, generator means for selectively producing signals, a source of reference potential, a plurality of transistor switches each having base, collector, and emitter electrodes, each of said base electrodes connected to said generator means, each of said collector electrodes connected to said source of reference potential, each of said emitter electrodes connected to a different one of said sensors, each of said signals causing one of said transistor switches to conduct for selectively electrically biasing the connected semiconductor sensor in a reverse breakdown condition to place the connected sensor in a low impedance condition thereby shunting said sensor in the low impedance condition to said common load, said transistor switches being normally in the nonconductive condition for maintaining said sensors in a high impedance condition.

3. A system comprising a plurality of parallel connected transistor sensors coupled to a common load, said transistor sensors having at least one force sensitive junction and counter means for sequentially biasing a different one of said sensors into conduction to permit a force being sensed at said junction to be detected by said common load, said sensors exhibiting a low impedance when biased into conduction in comparsion with the impedance of said sensor when it is nonconducting.

4. A system comprising a plurality of parallel coupled transistor sensors coupled to a common load, said transistor sensors having at least one force sensitive barrier region, and counter means for sequentially biasing a different one of said sensors into an avalanche condition to permit a force being sensed at said barrier region to be applied to said common load.

References Cited by the Examiner

UNITED STATES PATENTS

| | | |
|---|---|---|
| 2,497,770 | 2/1950 | Hanson. |
| 2,929,885 | 3/1960 | Mueller. |
| 3,120,758 | 2/1964 | Craddock et al. ____ 340—183 X |

ORIS L. RADER, *Primary Examiner.*

W. M. SHOOP, T. J. JOIKE, *Assistant Examiners.*